3,822,131
RADIOGRAPHIC ELEMENTS AND PRODUCTS
Henry M. Cleare, Rochester, N.Y., assignor to Eastman Kodak Company, Rochester, N.Y.
No Drawing. Original application Oct. 21, 1969, Ser. No. 868,222, now abandoned. Divided and this application Aug. 31, 1972, Ser. No. 285,292
Int. Cl. G03c 1/92
U.S. Cl. 96—82                    6 Claims

ABSTRACT OF THE DISCLOSURE

A radiographic image-recording element comprising an ultraviolet absorbing material, an improved image-recording product comprising said element and substantially ultraviolet emitting phosphors containing thickly covered intensifying screens and processes employing said materials are disclosed whereby improved radiographic characteristics are obtained.

This is a division of application Ser. No. 868,222 filed Oct. 21, 1969, and now abandoned.

BACKGROUND OF THE INVENTION

Field of the Invention

This invention relates to radiographic image-recording elements, image recording products comprising ultraviolet-sensitive silver halide layers and processes employing such materials. In one aspect, this invention relates to radiographic elements comprising duplitized silver halide coatings and, disposed therebetween, ultraviolet absorbing material. In another aspect, this invention relates to radiographic recording systems which comprise thick phosphor intensifying screens which unexpectedly imparts improved characteristics to said systems.

Description of the Prior Art

In the formation of radiographic images, it has long been known that use of a recording system comprising a screen-type X-ray film mounted between fluorescent intensifying screens, after exposure to a uniform beam of X-rays and processing, yields a density having a mottled appearance. This undesirable mottled appearance, known in the art as radiographic mottle, is not solely due to film graininess but rather is the result of local variations in exposure. Among the components of these coarse-density fluctuations is one known as quantum mottle, a particular source of which is the intensifying screens.

While the number of chemical compounds, i.e. phosphors, useful in the screens and capable of efficiently emitting sufficient light after excitation by X-ray, is small indeed, their emission efficiency bears considerably on the presence and degree of quantum mottle. It will be understood that by efficiency, is meant the average amount of light energy emitted by the phosphor per unit of X-ray energy absorbed.

Consequently, it has been concluded heretofore that the best type of phosphor-containing intensifying screen is one which is thinly coated in order to both reduce diffusion of screen light and which is made from materials which can highly absorb the X-ray photons falling thereon. While methods are known whereby the X-ray absorption of screens can be increased in order to reduce quantum mottle, the speed or sharpness of the system have invariably been sacrificed.

It could not have been expected that an improved radiographic system could be achieved by employing thicker, i.e. more highly absorbent and/or efficient, screens which emit in the ultraviolet spectral region, when used in combination with a novel radiographic element comprising an ultraviolet absorbing material as described herein. This is particularly so in duplitized silver halide coated radiographic elements where the crossover of diffused light produces unsharp images on the photographic emulsion coated on the opposite side. It has been known to use pigmented optical separating layers in simple photographic elements before, such as disclosed in U.S. Pat. 1,052,779, issued June 4, 1912 to Wilcox. In addition, other absorbers have been used in the phosphor screen supports where their lasting pigment quality has not been objectionable such as in U.S. Pat. 2,716,082, issued Aug. 23, 1955, to Smith. Where optical separators have been used as a barrier or in absorbing layers to protect against ultraviolet light, they have appeared only in optically sensitized films such as in U.S. Pat. 2,534,654, issued Dec. 19, 1950, to Barnes. However, nowhere in any of these are the particular problems of a complex radiographic system taught or contemplated.

SUMMARY OF THE INVENTION

In accordance with this invention there is provided an improved image-recording element which comprises a support bearing ultraviolet sensitive silver halide layers on opposite sides thereof and having a non-color imparting, non-fluorescing ultraviolet absorbing material between said layers. When this element is used in a radiographic system with a thick ultraviolet emitting phosphor screen, substantial and unexpected improvements result in the quantum mottle without impairing the intricately balanced systems of speed and image sharpness.

It is an object of this invention to reduce the quantum mottle of radiographic products and systems without impairing sharpness or speed.

It is another object of this invention to reduce the light diffusion in duplitized X-ray materials, products, and systems without disrupting the image-recording characteristics therein.

It is still another object of this invention to provide a unique product comprising a combination of thickened ultraviolet emitting phosphor screen and a non-fugitive ultraviolet absorbing material.

Other objects of this invention will become apparent.

DESCRIPTION OF PREFERRED EMBODIMENTS

In accordance with this invention, the above and other objects are attained with a radiographic image-recording element comprising a support bearing ultraviolet sensitive silver halide layers on opposite sides thereof and disposed between said layers, a non-color-imparting, non-fluorescing ultraviolet absorbing material.

The element so described comprises duplitized silver halide coatings borne by a suitable support. The silver halide can comprise varying amounts of silver chloride, silver iodide, silver bromide, silver chlorobromide, silver bromoiodide and the like. Particularly good results are obtained with silver bromoiodide emulsions in which the average grain size of the silver bromoiodide grains is in the range of about 0.5 to about 5 microns and preferably in the range of about 0.5 to about 0.6 microns.

In a preferred embodiment it has been found that a still further marked improvement in mottle can be achieved in the system disclosed herein by employing a slower silver halide emulsion such as is achieved by reducing the size of the silver halide grains.

For example, as set forth in the series III of Example I which follows, the reduction of the mean grain size of the radius of the silver halide grains from about $0.8\mu$ to about $0.6\mu$ results in a most marked mottle improvement in combination with the thickened phosphor screens.

The silver halide coatings can contain any of the hydrophilic, water permeable binding materials suitable for this purpose. Such suitable materials include gelatin, colloidal albumen, polyvinyl compounds, cellulose derivatives, acrylamide polymers and the like alone or in combination and mixture. The binding agents for the emulsion layer of the photographic element can also contain dispersed polymerized vinyl compounds. Certain of these compounds are disclosed for example in U.S. Pat. 3,142,568 of Nottorf, issued July 28, 1964; 3,193,386 of White, issued July 6, 1965; 3,062,672 of Houck et al. issued November 1962, and 3,220,844 of Houck et al., issued Nov. 30, 1965, and include the water insoluble polymers and latex copolymers of alkyl acrylates and methacrylates, acrylic acid sulfoalkylacrylates or methacrylates and the like.

Each of these photographic silver halide coatings generally comprises silver in the range of about 275 to about 625 mg. of silver per square foot but good results are obtained using coverages having a range of about 300 to about 450 mg. per square foot.

These duplitized, i.e. double coated photographic silver halide layers can also contain certain additives, particularly those known to be beneficial in such layers. For example, they can contain speed increasing compounds, such as the onium salts like quaternary or ternary sulfonium salts, polyakylene glycols, thioethers and the like. The photographic silver halide dual coatings can be stabilized with mercury compounds, azaindines, quaternary benzothiazolium compounds, hydroxy substituted aromatic compounds, and the like.

The photographic silver halide emulsions or coatings disclosed herein can also contain non-ionic, anionic and/or amphoteric coating aids. Some useful coating aids include, for example, saponin, alkyl substituted aryl oxy alkylene ethyl sulfonates of the type described in U.S. Pat. 2,600,831, issued June 17, 1952, maleopimarates of the type described in U.S. Pat. 2,823,123, issued Feb. 11, 1958, taurine derivatives of the type described in U.S. Pat. 2,739,891, issued Mar. 27, 1956 and alkyl aminopropionates of the type described in U.S. Pat. 3,133,816, issued May 19, 1964. Typical of still other coating aids and surfactants which can be employed in the emulsions of this invention include the alkyl phenoxy poly(glycidols) having from about 5 to about 12 glycidol units, for example such as those disclosed in British Pat. 1,022,878 issued Mar. 16, 1966 to Olin Mathieson.

These photographic emulsions and coatings can contain incorporated developing agents such as polyhydroxy benzenes, aminophenols and 1,3-pyrazolidones and the like. The photographic coatings and emulsions can also contain spectral sensitizers such as cyanines, merocyanines, complex (tri-nuclear) cyanines and complex (tri-nuclear) merocyanines, styryls and hemicyanines.

In addition these duplitized silver halide radiographic emulsions and coatings can be chemically sensitized with compounds of the sulfur group, noble metal salts, such as gold salts, reduction sensitized with reducing agents and combinations of these. Furthermore, these sensitive layers and other layers present in the elements of this invention can be hardened with any suitable hardener or combinations such as aldehyde hardeners, aziridine hardeners, hardeners which are derivatives of dioxane, vinyl sulfones, oxypolysaccharides such as oxystarch, oxyplant gums, inorganic hardeners such as chromium salts and the like.

It will be understood by those skilled in the art that the radiographic image recording elements disclosed herein can be processed in a variety of ways, such as by use of the manual conventional multi-tank methods well known in the art and in the automatic processing systems disclosed in Belgian Pat. 700,301, issued Aug. 31, 1967 to Barnes, Rees and Wilt and by the methods disclosed in U.S. Pat. 3,232,761, issued Feb. 1, 1966 to Allen and Burness, for example. These elements comprise a support which is substantially transparent or lightly tinted and is reasonably flexible so as to permit both conventional processing utilizing a series of processing tanks and a rapid access processing employing transport systems such as a mechanized roller transport system. Typical of said supports are cellulose nitrate film, cellulose ester film, polyvinyl acetal film polystyrene, polyethylene terephthalate film and other polyester film and the like. In a preferred embodiment the support comprises a linear condensation polymer of high molecular weight. One suitable polymer of this type is polyethylene terephthalate which can be melt extruded to form bases of varying thicknesses as desired, e.g., in the range of about 1 to about 10 mils. Polymers of this type are often melt extruded at temperatures in the range of about 270° C. to about 305° C. Due to their stability upon melt extrusion at such temperatures, the furanone ultraviolet absorbing materials described hereinafter form a preferred class of compounds which can be incorporated into such a base. In addition, the furanones are compatible with an non-subliming in polyethylene terephthalate base.

These linear polyester materials are linear polyesters of at least one glycol having 2 to 10 carbon atoms and at least one dibasic acid comprising at least 50 mole percent of an acid having two carboxy radicals attached to a carbocyclic nucleus having from 4 to 6 carbon atoms per ring, said ester having a number average molecular weight of 10,000 to about 100,000, an inherent viscosity in a mixture of 60% phenol and 40% tetrachloroethane of at least 0.3 and melting at from about 175° to about 350° C.

In general, the ultraviolet absorbing materials employed in the practice of this invention possess the characteristics of solvent stability, and compatibility with other absorbing materials possessing similar characteristics, in order that they can be used alone or in combination therewith. In addition, the ultraviolet absorbing compounds employed in the practice of this invention are non-proteinaceous and possess little or no absorbing capability in the visible range of the electromagnetic spectrum. This means that the absorbers are most effective at wavelengths of about 410 nm or less. It is equally important that these ultraviolet, non-fluorescing absorbers be essentially non-color imparting in order to obviate extensive leaching or bleaching processes as are required for fugitive type and sometimes pigmented absorbers.

As already indicated, a class of particularly good absorbing materials for use in the elements and systems of my invention are furanones. Suitable materials possess the general formula:

$$\begin{array}{c} O \\ O=C \diagup \diagdown C=D-W-Q \\ A-C = C-B \end{array}$$

wherein A is

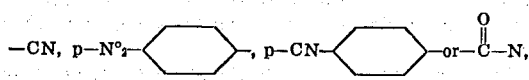

R being an amino, substituted amine, alkoxy, aralkoxy, alkyl, aryl, or heterocyclic substitutent; B is an alkyl, aryl, aralkyl, alkaryl or H substitutent; D is a methylidene radical

a polymethine chain

a hydrazinylidene radical or alkylenemethylidene radical

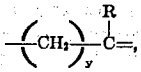

an arylene methylidene radical,

where Ar is an aryl group and R is hydrogen, alkyl phenyl or substituted phenyl, $x$ is 1 to 3 and $y$ is 1 to 4;

W is either a carbon-carbon single bond or a methylidene radical; Q is an alkyl, aryl, or a heterocyclic ring and D, W and Q taken together can be a cycloalkylidene group having 5 to 6 carbon atoms.

It will be understood that in the above formula, amino is —$NH_2$; substituted amine can be represented for example by anilino, diethyl or dimethyl amino, methyl or ethyl amino and the like; alkoxy can be a radical containing 1 to 6 carbon atoms in the alkyl portion, such as methoxy, propoxy and the like; aralkoxy represents a moiety in which the alkyl portion has less than 6 carbon atoms, for example, phenethoxy, phenmethoxy and the like; alkyl is a moiety having 1 to 8 carbon atoms; such as methyl, ethyl, propyl, isopropyl, butyl and the like; aryl is a moiety having up to 20 carbon atoms such as exemplified by phenyl, naphthyl, aminophenyl, nitrophenyl, chlorophenyl and the like; heterocyclic is exemplified by thiazolyl, imidazolyl, furyl, pyrolyl, quinolyl 1,3,3-trimethylindolene 2-ilidene, julolydyl, benzothiazole and the like; aralkyl is exemplified by benzyl, phenethyl, naphthylmethyl and the like; alkaryl is represented by tolyl, (ortho, meta or para) xylyl, methylnaphthyl and the like; alkylidene is exemplified by pyroxylidene methylidene and the like and aralkylidene is exemplified by phenylenemethylidiene and the like.

Specific examples include:

3-cyano-5-orthonitrobenzylidene-4-phenyl-2(5H)-furanone 5-benzylidene-4-methyl-3-p-nitrophenyl-2-(5H)furanone 3,4-(p-nitrophenyl)-2(5H)furanone 5-benzylidene-3-carbamoyl-4-phenyl-2(5H)furanone 3-cyano-4-phenyl-5,4-pyridylmethylene-2(5H)furanone 3-carbamoyl-5(2-methylbenzylidene)-4-phenyl-2(5H)furanone 5-benzylidene-3-N(ethoxycarboxyl)carbamoyl-4-phenyl-2(5H)furanone 5-benzylidene-3-phenyl-ureido-4-phenyl-2(5H)furanone 5-benzylidene-3-cyano-4-phenyl-2(5H)furanone 3-cyano-5-dimethylamino-methylidene-4-phenyl-2(5H)furanone When incorporated in the base, the above-described class of ultraviolet absorbing materials are suitably added to the linear polyester resin powder in a range from about 50 to about 2,000 parts per million prior to extrusion, drafing and tentering.

In addition to being suitably incorporated within the exrtusion-formed base support, said ultraviolet absorbing materials can also be present when otherwise incorporated between the silver halide layers of the element. For example, these substantially non-color imparting absorbing materials can be present both in the support and coated over the base support and carried in a suitable layer such as a hydrophilic colloid layer, like gelatin, or water dispersible vinyl polymers or mixtures thereof and the like.

Suitable other ultarviolet absorbing materials useful in such layer arrangements alone or in combination as described above include not only the above-identified furanones but also several types of organic compounds such as the benzophenones, such as exemplified by 2,2' dihydroxy 4,4' dimethoxy benzophenone and the like, the benzotriazoles such as exemplified by 2(2' hydroxy, 5' methylphenyl) benzotriazole and the like and the acrylonitriles and the like.

The duplitized silver halide coated image-recording products of this invention can include both integral or non-integral phosphor-containing intensifying screens which are employed outward from each silver halide coating on opposite sides of the support for the ultraviolet sensitive silver halide coatings. An improved system of this type is achieved by employing phosphors capable of emitting substantially within the ultraviolet electromagnetic spectral range, i.e. at about 400 nm. or less. Phosphors which are particularly useful and preferred are those disclosed in and prepared according to Belgian Pat. 703,998, issued Mar. 18, 1968, to Luvkey. Typical of said phosphors are lanthanide-or lead activated $BaSO_4$, lead activated barium silicate, gadolinium activated-yttrium oxide, and barium fluoride, and the like.

These screens can be coated in a variety of ways such as directly over a silver halide layer, on the opposite side of the support from a silver halide layer or on both sides of a duplitized silver halide coated element. Intermediate layers such as stripping layers, protective or overcoat layers can likewise be used between or over the X-ray sensitive layers and the intensifying screens.

The fluorescent screens useful in the radiographic products of this invention can employ any suitable binder including those set forth for example in U.S. Pats. 3,300,310 and 3,300,311, issued Jan. 24, 1967 to Kennard and Anderson. In a preferred embodiment these ultraviolet emitting phosphors are doped, i.e. activated with a suitable activator such as lead or europium, and are suspended in a polycarbonate resin binder. The weight ratio of the pigment i.e. phosphor to the binder is generally in the range of from about 30 to 1 to about 6 to 1 and preferably about 8 to 1 to about 14 to 1. In a preferred case, the phosphor is coated in each screen in a thickened coverage of about 45 to about 75 grams per square foot of support and preferably at about 50 grams per square foot of support. This measured thickness is in a range of from about 200 to about 230 microns (about 8 to 11 mils). Said phosphor screen can have a protective overcoating layer which can be of various materials such as vinyl polymer, gelatin derivatives and even of the same polycarbonate material as is employed on the binder for the phosphor. The phosphor screen can be non-integral, i.e. it can be coated on a separate support from the silver halide coatings or it can be integral, i.e. coated on the same support. The support for the phosphor can include a variety of layers to render it either non-reflecting or reflecting. For example, in a non-intergral screen an anti-halation layer positioned between the phosphor screen and the support can be comprised of various dyes, or pigmented materials or materials which are opaque to emitted radiation to further improve sharpness.

The following example is included for a further understanding of my invention.

EXAMPLE I

In order to demonstrate that acceptable decreased mottle, i.e. random density fluctuations can be achieved without adversely affecting system speed or sharpness, a series of screens are employed in various combinations with duplitized coated radiographic ultraviolet sensitive films. The ultraviolet sensitive material in the film is silver bromoiodide. Some of these films are coated at a thickness of about 425 mg. silver/ft.$^2$ coating while others are coated at about three-fourths of that, i.e. 323 g./silver on polyethylene terephthalate supports. The intensifying screens used are of two types, one being a standard commercially available calcium tungstate, phosphor-containing screen coated at a coverage of about 35 g./ft.$^2$ and having a measured thickness of about 4 mils. The other type screen is a substantially ultraviolet emitting phosphor screen, comprising the phosphor $BaSO_4$: Pb in density coverages of both 35 g./ft.$^2$ with a measured thickness of about 6 mils and the thickened 5 g./ft.$^2$ coverage and measured thickness of 8 mils. Where indicated, a non-color imparting ultraviolet absorbing material, i.e. 5-benzylidene-3N-(ethoxycarbonyl) carbamoyl-4-phenyl-2(5H) furanone is used in the film support.

Speed values are determined by employing an aluminum stepped wedge during exposure at 70 Kv. The presence and degree of mottle is visually and qualitatively determined after processing by evaluating the degree of interference with overall image visibility, and particularly in the low contrast, unsharp images. Extreme care is taken to exclude element graininess as a factor in the determination of mottle. Processing is effected by employing a unidirectional high speed roller system apparatus of the type described in Belgian Pat. 700,301, issued Aug. 31, 1967. Said apparatus is commercially available and identified by the name "X-OMAT," a trademark of the Eastman Kodak Company.

In Series I where a thin commercially available calcium tungstate phosphor screen having less than half of its spectral emission in the ultraviolet region of the spectrum, is used. The inclusion therein of an ultraviolet absorber only silghtly decreases system speed without change in mottle. The combination of calcium tungstate screen and element comprising film coverage of 425 mg. of silver without an ultraviolet absorber in the support is a widely accepted commercially available product.

Thus these results demonstrate that in radiographic systems the use of an element comprising a non-color imparting ultraviolet absorbing material disposed between the duplitized radiographic ultraviolet sensitive silver halide layers can be used in combination with substantially ultraviolet emitting thick phosphors to improve the mottle adversely affecting other desirable and interrelated radiographic characteristics.

Similar good results are also achieved (1) when the ultraviolet absorbing material is present as an overcoat layer on the support in a concentration range between about 0.5 to about 2% introduced by solvent application using a 1 to 4% cellulose acetate and acetone-methyl-alcohol (75:25) solution, and (2) when the absorber is present both in an overcoat layer on the support and in the support which contains an ultraviolet absorber. In such cases an effective concentration of absorbing ma-

SERIES I

| Phosphor screen (coverage) | Film coverage of mg. of silver (per coated side) | Polyethylene terephthalate support | Speed | Sharpness | Mottle |
|---|---|---|---|---|---|
| Commercial calcium tungstate | 323 | With ultraviolet absorber | 100 | Unacceptable | Present. |
| Do | 323 | No ultraviolet absorber | 110 | do | Do. |
| Do | 425 | do | 100 | Acceptable | Do. |

In Series II, thinly coated phosphor screens which emit substantially in the ultraviolet region of the spectrum provide unacceptable mottle in all cases. This poor mottle is particularly unacceptable even in those cases where the use of an absorber results in an improved system sharpness, a decrease in speed occurs. Where, under similar screen and silver halide coverage, no absorber is used, an increase in speed and a decrease in system sharpness results with mottle remaining unacceptable.

terial in the overcoat layer is in the range of from 1 to 10% which is introduced through solvent application employing methyl alcohol-acetone solvent and 1 to 4% cellulose acetate. This is applied over the polyethylene terephthalate support using a hydrophilic colloid binding layer of gelatin.

The invention has been described in detail with particular reference to certain preferred embodiments thereof, but it will be understood that variations and modifica-

SERIES II

| Phosphor screen (coverage) | Film coverage of mg. of silver (per coated side) | Polyethylene terephthalate support | Speed | Sharpness | Mottle |
|---|---|---|---|---|---|
| $BaSO_4$:Pb (35 g./ft.$^2$) | 323 | No ultraviolet absorber | 115 | Sharper | Unacceptable, poor. |
| $BaSO_4$:Pb (35 g./ft.$^2$) | 323 | With ultraviolet absorber | 100 | Substantially sharper | Do. |
| $BaSO_4$:Pb (35 g./ft.$^2$) | 425 | No ultraviolet absorber | 110 | do | Do. |

In Series III, thickly coated substantially ultraviolet emitting phosphor screens provide marked total system improvement in speed, sharpness and mottle in all cases. By the use of a fine grain silver halide emulsion in the duplitized coatings of this series, an even greater improvement in mottle is achieved with a reduced system speed which is at least equal to the commercially available systems of Series I.

Optimum effects are achieved according to this invention, by employing a thickened phosphor coating with an absorber in the support to provide a high speed, acceptable sharpness, and equally acceptable mottle to other cases in this series. In all cases in said series, mottle is improved over both the commercial calcium tungstate and thin $BaSO_4$:Pb screens, or at least not less acceptable.

tions can be effected within the spirit and scope of the invention.

I claim:

1. In a duplitized silver halide coated image recording product comprising a radiation sensitive element comprising a support coated on both sides with a silver halide emulsion and phosphor screens on opposite sides of said radiation sensitive element, the improvement which comprises employing in each of said screens, a phosphor capable of emitting substantially within the ultraviolet region of the electromagnetic spectrum, said phosphor being coated in each of said screens at a coverage in the range of from about 45 to about 75 grams/ft.$^2$ of support, and positioned intermediate said silver halide emulsions,

SERIES III

| Phosphor screen (coverage) | Film coverage of mg. of silver (per coated side) | Polyethylene terephthalate support | Speed | Sharpness | Mottle |
|---|---|---|---|---|---|
| $BaSO_4$:Pb (50 g./ft.$^2$) | 425 | No ultraviolet absorber | 160 | Acceptable | Present, as in Series I. |
| $BaSO_4$:Pb (50 g./ft.$^2$) | 425 | With ultraviolet absorber | 150 | do | Present, better than Series I. |
| $BaSO_4$:Pb (50 g./ft.$^2$) | 323 | No ultraviolet absorber | 160 | Unacceptable | Do. |
| $BaSO_4$:Pb (50 g./ft.$^2$) | 323 | With ultraviolet absorber | 145 | Acceptable | Do. |
| $BaSO_4$:Pb (50 g./ft.$^2$) | [1] 323 | do | 100 | do | Improved over above in this Series III. |

[1] Fine grain, slow silver halide emulsion.

an ultraviolet absorbing material having the general formula:

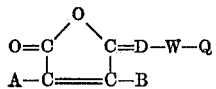

in which A is

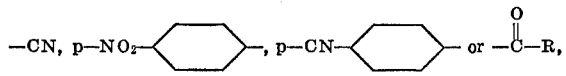

R being an amino, substituted amine, alkoxy, aralkoxy, alkyl, aryl or heterocyclic substituent; B is an aryl, alkyl, aralkyl, alkaryl substituent or H; D is a methylidene radical

a polymethine chain

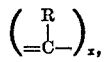

a hydrazinylidene radical or alkylenemethylidene radical

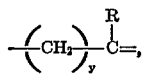

an arylenemethylidene radical,

where Ar is an aryl group and R is hydrogen, alkyl phenyl or substituted phenyl, $x$ is 1 to 3 and $y$ is 1 to 4, W is either a carbon-carbon single bond or a methylidene radical; Q is an alkyl, aryl, or heterocyclic ring; and D, W and Q taken together can be a cycloalkylidene having 5 to 6 carbon atoms.

2. The product of claim 1 in which said phosphor comprises $BaSO_4$ doped with Pb or europium.

3. The product of claim 1, in which said ultraviolet absorbing material is selected from the group consisting of
3-cyano-5-orthonitrobenzylidene-4-phenyl-2(5H) furanone,
5-benzylidene-4-methyl-3-p-nitrophenyl-2(5H) furanone,
3,4-di(p-nitrophenyl)-2(5H)furanone,
5-benzylidene-3-carbamoyl-4-phenyl-2(5H)furnanone,
3-cyano-4-phenyl-5,4-pyridylmethylene-2(5H)furnanone,
3-carbamoyl-5(2-methylbenzylidene)-4-phenyl-2(5H) furanone,
5-benzylidene-3-N-(ethoxycarboxyl)carbamoyl-14-phenyl-2(5H)furanone,
5-benzylidene-3-phenyl-ureido-4-phenyl-(2(5H) furanone,
5-benzylidene-3-cyano-4-phenyl-2(5H)furanone and
3-cyano-5-dimethylamino-methylidene-4-phenyl-2(5H) furanone
and said support is polyethylene terephthalate.

4. The product of claim 1 in which said duplitized silver halide coating comprises silver bromoiodide grains having a mean grain size range of from about 0.5 to about 5 microns.

5. The product of claim 1 in which said ultraviolet-radiation absorbing material is incorporated into said support.

6. A radiographic process which comprises image-wise exposing to X-rays a duplitized product of claim 1 and developing said exposed product.

References Cited

UNITED STATES PATENTS

| | | | |
|---|---|---|---|
| 2,887,379 | 5/1959 | Blake et al. | 96—82 |
| 3,617,285 | 11/1971 | Staudenmayer | 96—82 |
| 3,712,827 | 1/1973 | Gramza | 96—82 |
| 3,734,735 | 5/1973 | Bories | 96—82 |
| 3,737,313 | 6/1973 | Rosecrants et al. | 96—82 |

OTHER REFERENCES

Ford et al.: The Preparation of 2(5H)-Furanones and Dyes Derived Therefrom, Journal of Organic Chemistry, 32, 173, 1967.

RONALD H. SMITH, Primary Examiner

E. C. KIMLIN, Assistant Examiner

U.S. Cl. X.R.

96—84 R; 117—335 R; 96—45.1; 250—320, 458